(12) United States Patent
Harris

(10) Patent No.: US 7,375,942 B1
(45) Date of Patent: May 20, 2008

(54) FLEXIBLE SECONDARY OVERCURRENT PROTECTION

(75) Inventor: Richard A. Harris, Palo Alto, CA (US)

(73) Assignee: FulTec Semiconductor, Inc., Mountain View, CA (US)

( * ) Notice: Subject to any disclaimer, the term of this patent is extended or adjusted under 35 U.S.C. 154(b) by 101 days.

(21) Appl. No.: 11/292,336

(22) Filed: Dec. 1, 2005

Related U.S. Application Data

(60) Provisional application No. 60/651,715, filed on Feb. 10, 2005.

(51) Int. Cl.
  *H02H 1/00* (2006.01)
  *H02H 3/22* (2006.01)
(52) U.S. Cl. .................................... 361/119
(58) Field of Classification Search ................ 361/119
   See application file for complete search history.

(56) References Cited

U.S. PATENT DOCUMENTS

| | | | | |
|---|---|---|---|---|
| 4,205,358 A | * | 5/1980 | Washington | 361/44 |
| 4,446,334 A | * | 5/1984 | Groff | 379/188 |
| 4,536,816 A | * | 8/1985 | Matsumura et al. | 361/91.8 |
| 4,580,186 A | * | 4/1986 | Parker et al. | 361/42 |
| 5,457,591 A | * | 10/1995 | Mock et al. | 361/18 |
| 6,882,514 B2 | * | 4/2005 | Mutunga et al. | 361/119 |

\* cited by examiner

*Primary Examiner*—Ronald W Leja
(74) *Attorney, Agent, or Firm*—Lumen Patent Firm, Inc.

(57) ABSTRACT

A protection system in which a shunt protection device at the interface terminals is optically triggered by sensor components within the circuit. This permits a variety of appropriate overvoltage detection thresholds to be defined at different nodes within the circuit. Preferably the shunt protection device is combined with one or more series protection devices which interrupt overcurrent.

30 Claims, 8 Drawing Sheets

FLEXIBLE SECONDARY OVERCURRENT PROTECTION

CROSS-REFERENCE TO OTHER APPLICATIONS

This application claims priority from U.S. provisional application 60/651,715 filed Feb. 10, 2005, which is hereby incorporated by reference.

BACKGROUND AND SUMMARY OF THE INVENTION

The present invention relates to surge protecting units, and more specifically to circuit and system configurations which provide transient protection for communications modules.

In some electronic systems, such as telephone interface circuits, different system components require different levels of overvoltage and/or overcurrent protection. For example, many SLIC (subscriber line interface circuit) boards are multifunctional, and must interface not only to lines with internally or externally generated ring signals, but also to lines with analog voice and/or high-speed data digital subscriber line.

The boards themselves have a different interface for each of the functions. Each of these interfaces can have a different damage threshold (i.e. each can be damaged by different voltages). As a result, one common level protection with a single protection voltage is unsuitable to protect these cards.

The conventional method of protecting such SLIC based electronics is to place a number of shunt protective elements in the circuit with the desired protection level. Each element is placed immediately adjacent to the interface it is to protect. This technique is shown in FIG. 1.

FIG. 1 illustrates a conventional method of protection. Two terminals (here conventionally labeled Tip and Ring) are fed through respective line feed resistor components LFR, which may include a fusible link. A first protection stage 110, which in this example is implemented by a pair of breakdown diodes, provides a first layer of protection for the LCAS relay (line card access system relay) 120. The LCAS 120 will connect the SLIC interface to the Tip and Ring terminals in the off-hook condition, or disconnect it in the on-hook condition.

When a telephone line receives an incoming call, the ring voltage seen by the LCAS can be 100V above the DC voltage otherwise seen, so that the first protection stage 110 must not suppress normal ring voltages. However, the SLIC interface 140 may not be able to tolerate such high voltages, so the second protection stage 130 may need to be set for a much lower protection voltage. and the SLIC is normally protected from ring voltage by the relay. Thus the second shunt protection stage 130 preferably sets a maximum voltage (for off-hook conditions) which is much lower than that set by the first shunt protection stage 110. As more complex functions are added into telephone line interfaces, other voltage protection values may be needed for other interface elements.

One of the basic design requirements of a robust electrical system is protection against out-of-specification electrical conditions of many kinds, which can arise from many causes. These may include power surges, transient overcurrents, and voltage spikes corresponding to various values of transient energy and source impedance. A variety of protection components have been proposed.

For example, one component is a metal oxide varistor (MOV), which exhibits low differential resistance under sufficiently high applied voltage, and can therefore be useful as a shunt protection device. Another is a positive temperature coefficient polymer (PTC); this exhibits a resistance which increases rapidly in response to temperature rise, and hence can be useful for series protection against overcurrents.

A newer protection component is the transient blocking unit (TBU). The TBU is a very fast disconnection device, which can be used as a series protection device to block transient overcurrents. A TBU will typically have a much faster response time than a PTC and does not require a power source. In addition, the TBU, unlike the PTC, does not limit circuit bandwidth. TBUs are described e.g. in U.S. Pat. No. 5,742,463, in US published application US2005128669, and in published PCT applications WO2005020402, WO2004034544, WO03069753, and WO2004006408; all of these are hereby incorporated by reference.

Flexible Secondary Overcurrent Protection

The present inventions are directed towards a surge protection system which includes the ability to remotely activate surge-protecting elements, and to use a single surge-protecting element to protect equipment with different electronic thresholds.

For example, in one embodiment, a single light activated shunt protection component (e.g. a photothyristor) is placed at the connection terminal where an external line is connected to the circuit. This shunt protection component preferably is rated to crowbar at the maximum protection voltage of the circuit, even when it is not optically activated. In this embodiment, the thyristor can be adapted to be triggered into conduction through light activation. Light emitting devices can be placed at other locations within the circuit, including locations that are not always connected to the external line. In this way, many nodes of the circuit may be protected with a single protection device. If the voltage at any one of these nodes reaches its defined trip point, the LED turns on and the protection thyristor is thereby activated.

In another embodiment, the light activated shunt device is combined with a transient blocking unit (TBU) as a series device. Since the TBU is a fast switching device, the current handling requirements of the shunt device (e.g. thyristor) can be optimized, and the thyristor need only be capable of handling the peak current surge which can pass the TBU. This provides secondary advantages, including the possibility to make the device very small, sensitive, and cost effective.

Advantages of the disclosed innovations include, in various embodiments, some or all of the following:

Only one set of the relatively expensive protection components is required.

Different overvoltage levels can easily be assigned for different internal nodes of a circuit, with only a small increase in cost and complexity.

Overvoltage protection with different slew rate dependences can be used for different internal nodes of a circuit, without any increase in cost and complexity.

Overvoltage monitoring can easily be added to many internal nodes of system, with only a small increase in cost and complexity.

Line loading by the parasitic capacitance of the shunt protection device can be minimized.

Line loading by the shunt protection device is constant despite variation in the number of secondary nodes which need to be protected.

A given basic configuration of protection components can be used in a variety of system configurations.

The size of the shunt protection component can be optimized.

The whole subsystem can readily be decoupled from its inputs for internal test operations.

Telecomm system applications, such as SLIC boards, are particularly advantageous.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

One of the innovative embodiments disclosed is an improved method of protection which uses one or more optically activated devices (e.g. a series pair of photothyristors) at the interface to the external line terminals. This shunt protection device is rated to crowbar at the maximum protection voltage of the circuit (typically the protection voltage of the ring generator). In this embodiment, the thyristor can also be triggered into conduction through light activation. The thyristor is used in conjunction with suitable numbers of optical triggers (implemented e.g. as LEDs). These LEDs can be used to sense overvoltages at other locations within the circuit (typically at areas of the circuit which are intermittently connected to the line but have a protection voltage less than the maximum). If the voltage at any of these points reaches its predetermined protection voltage level, the LED turns on and the protection thyristor is activated.

Figure 1:
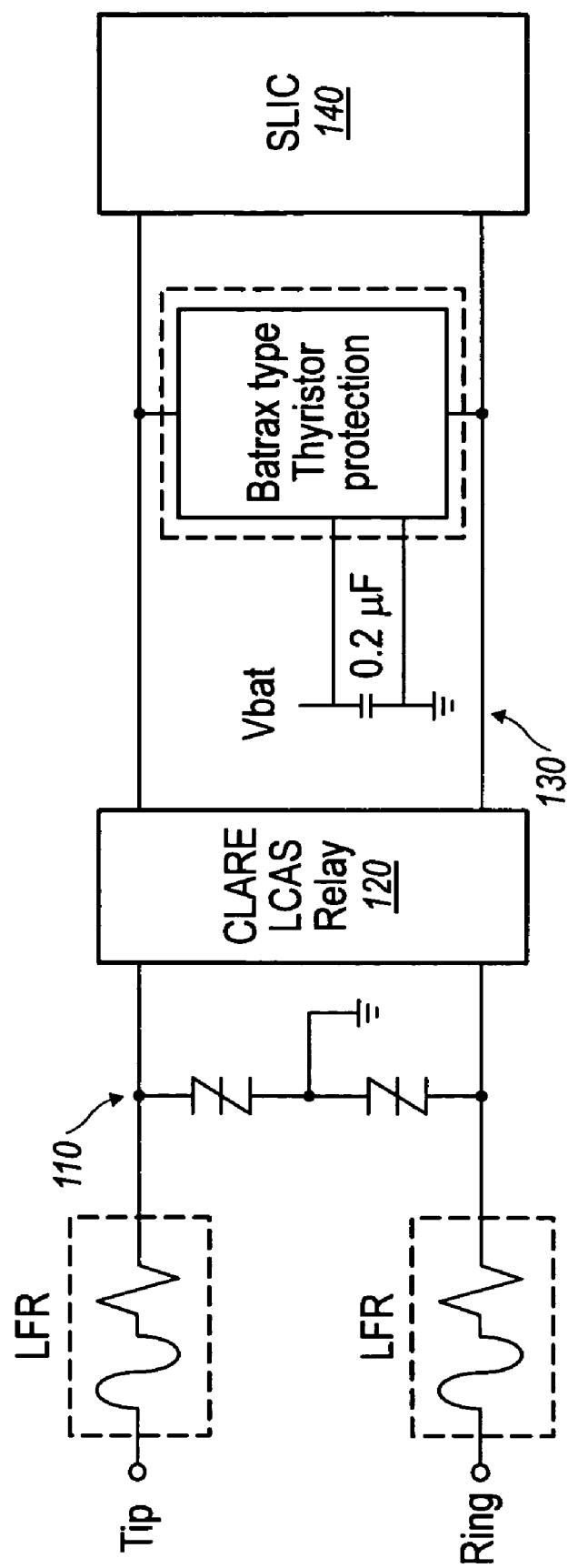
FIG. 1 shows a prior art protection circuit configuration.
Figure 2:
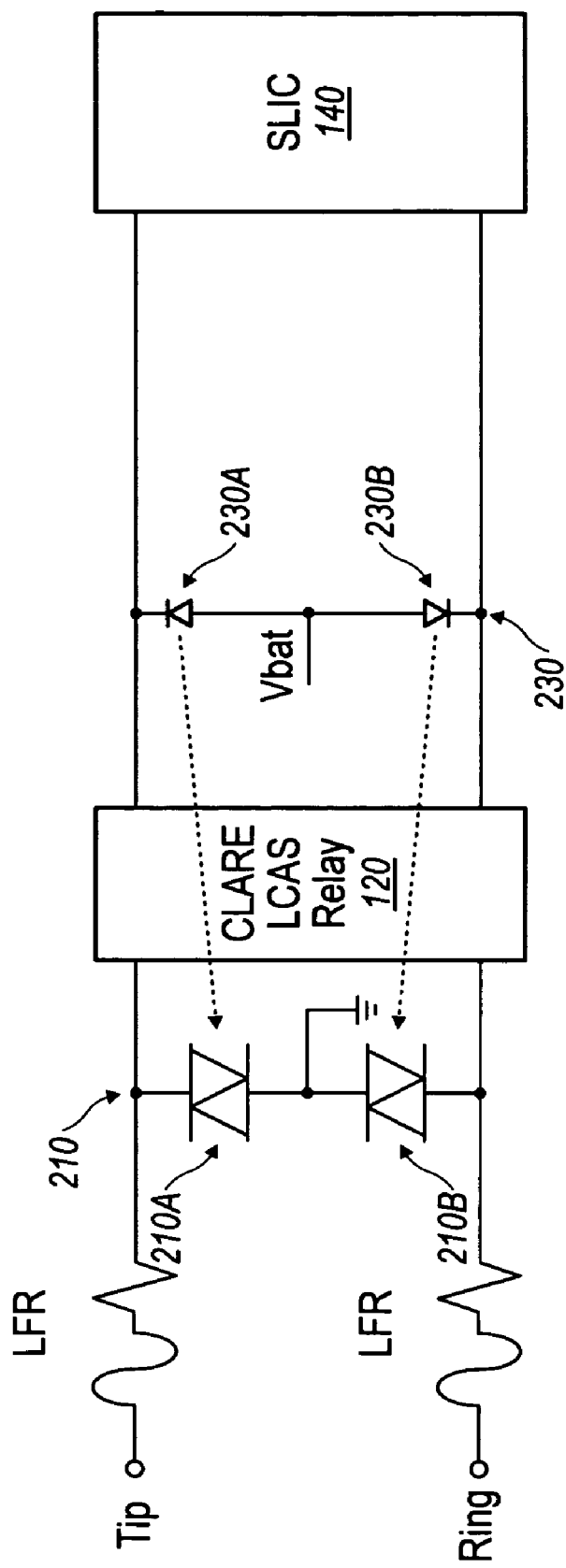
FIG. 2 shows a first sample embodiment, in which LEDs are connected to optically trigger a shunt protection device.

One embodiment of this system is disclosed in FIG. 2. (This example is a telephone line interface circuit, for better comparison with FIG. 1, but of course the innovative principles it shows can be adapted to a wide variety of other circuits.) A shunt protection element 210, such as a pair of photothyristors 210A/210B, is connected across the Tip and Ring terminals. Series protection components LFR are used as in FIG. 1.

The circuit of FIG. 2 provides two modes of protection. First, if the voltage on the "Tip" terminal rises above the breakdown voltage of photothyristor 210A, photothyristor 210A will fire and drop that line's voltage to ground. (Voltage excursions on the "Ring" line can similarly fire photothyristor 210B.) Secondly, LED 230A or LED 230B will turn on if they see an out-of-bounds voltage. (In the configuration shown this would occur if either LED's cathode falls below battery voltage Vbat by more than the LED's forward diode drop, but other voltage-detection configurations can of course be used.)

Figure 3:
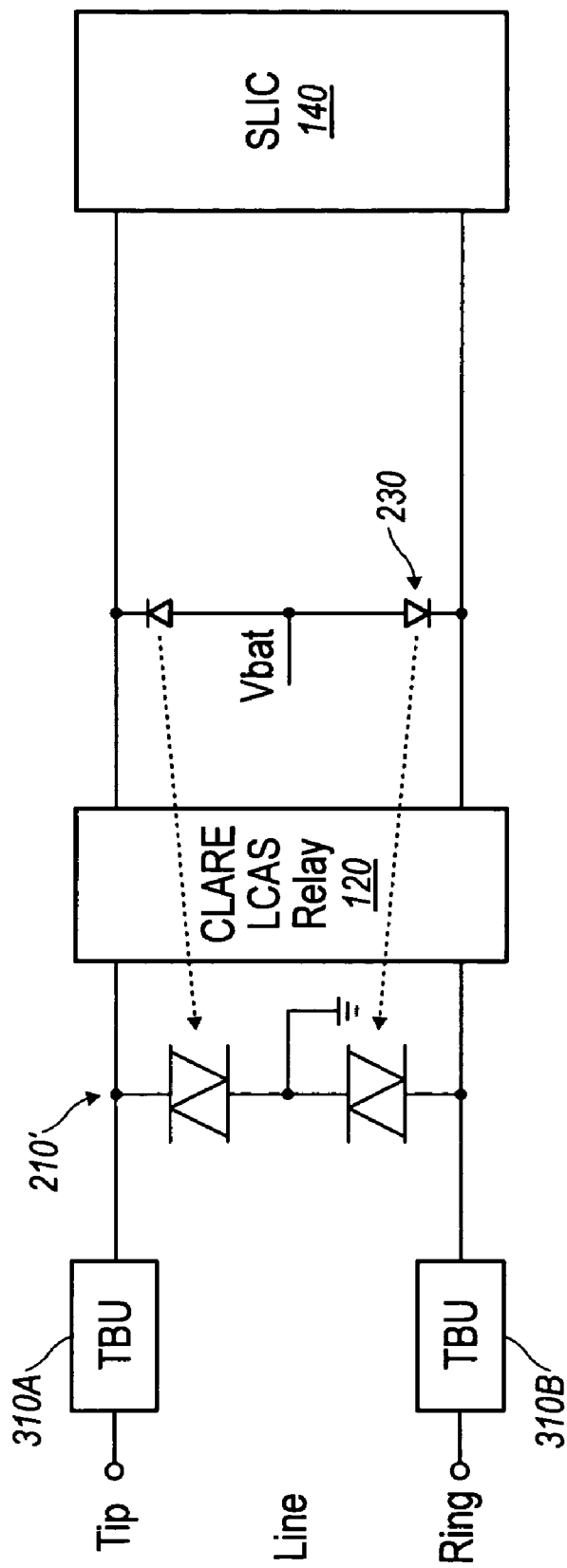
FIG. 3 shows a second sample embodiment, in which an optically triggered shunt protection device is combined with reversibly-acting series protection devices.

FIG. 3 shows another general class of embodiments, in which an optically triggered shunt protection device is combined with reversibly-acting series protection devices 310 (preferably TBUs, described above).

The TBU is a very fast disconnection device, which is activated by over-current to form a high resistance boundary for surge current. TBUs can respond with a delay on the order of a micro-second to block surge currents.

In the embodiment shown in FIG. 3, once a shunt protection device 210' fires, the rising surge current caused by the short circuit trips at least one of the TBUs 310A/310B, isolating the thyristor 210' and all of the electronic circuitry 120/140 from the line. Because the TBUs are extremely fast, the current handling requirement of the shunt protection device 210' can be optimized. The shunt protection device 210' needs to be only capable of handling the peak let-through current of the TBU 310, rather than the peak surge current which surge source might be able to deliver. This leaves open the possibility to make this device very small, very sensitive and very cost effective. Specifically, the shunt device 210' can be made smaller, for some applications, than the shunt device 210 which would be required in a circuit configuration like that of FIG. 2. This saves cost, and also avoids the size requirements of the high-current device. Conversely, the blocking capability of the TBU allows the protection system to withstand more severe surge current sources.

Using the disclosed inventions, the entire protection arrangement can be included in one highly miniaturized package. This package can provide combination SLIC protection (for POTS, ADSL and external ring protection on one Tip/Ring pair) in one highly miniaturized package.

Figure 4:
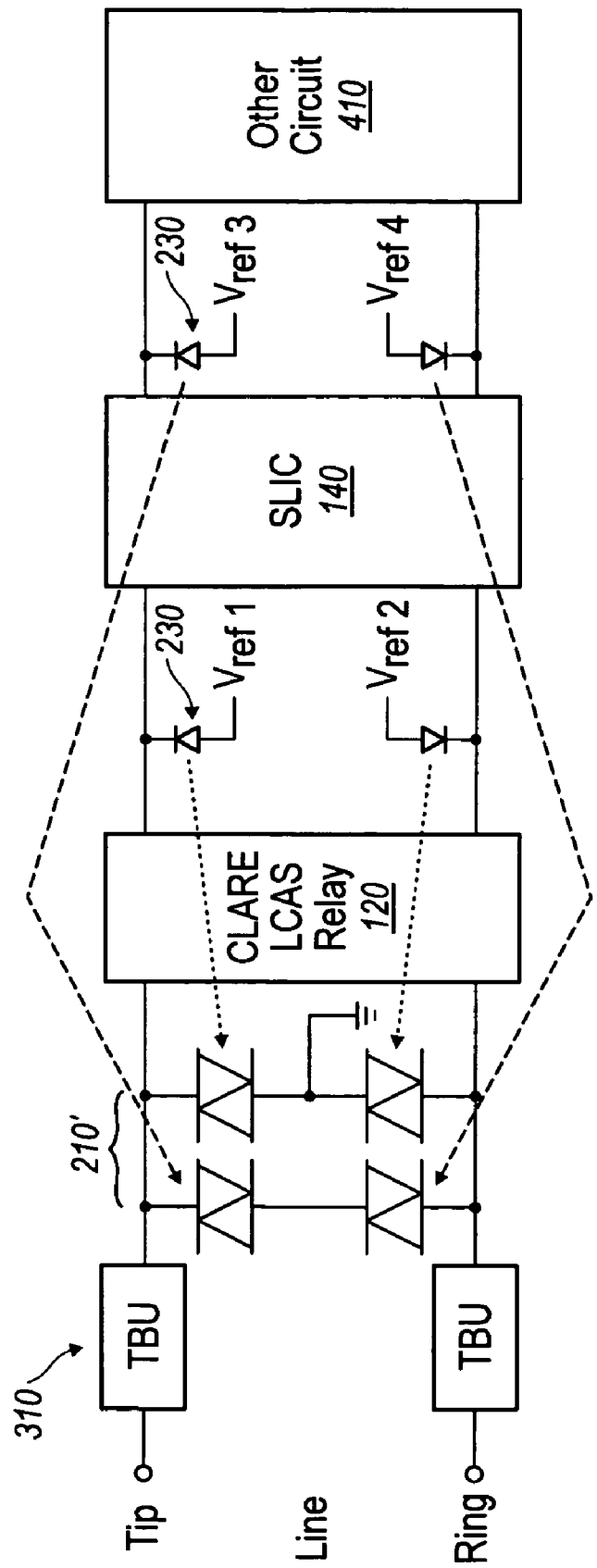
FIG. 4 shows another sample embodiment, in which different reference voltages are used for overvoltage detection on different circuit nodes.

FIG. 4 shows another sample embodiment, in which different reference voltages are used for overvoltage detection on different circuit nodes. In this embodiment another circuit 410 is connected to the SLIC 140, but the key point to note in this figure is that separate reference voltages are provided for each of the four LEDs 230 shown.

Figure 5:
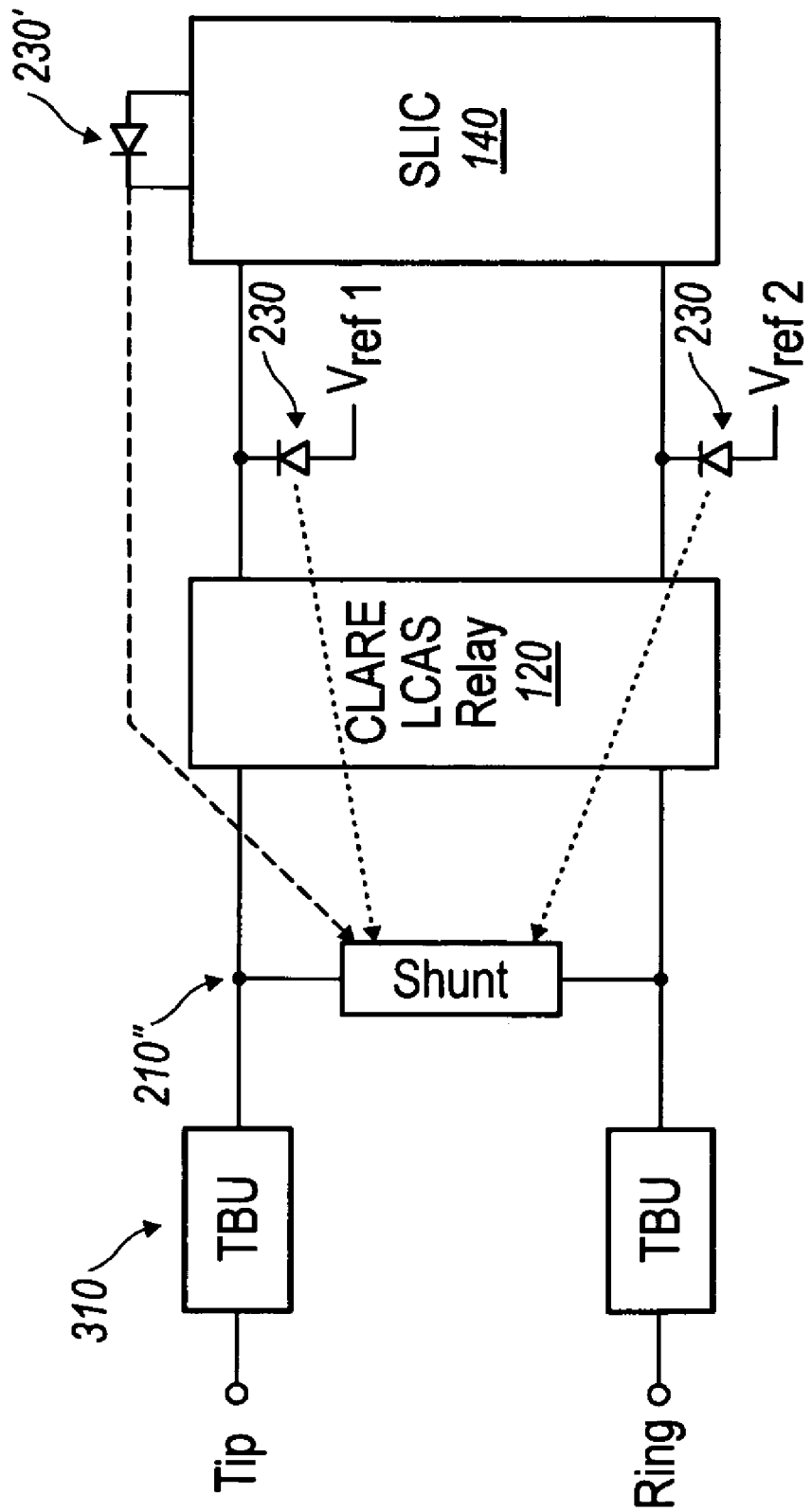
FIG. 5 shows another sample embodiment, in which the shunt protection device can also be triggered by an LED which is responsive to a logic input.

FIG. 5 shows another sample embodiment, in which the shunt protection device 210" can be triggered not only by voltage detection LEDs 230 as above, but is also optically coupled to be triggered by an LED 230' which is responsive to a logic input. (Note that in this embodiment the shunt protection 210" is shown simply as a circuit block, to emphasize that a variety of remotely activated protection components can be used here.) Note also that the polarities of LEDs 230 shown here are opposite to those of previous figures, i.e. the LEDs will turn on with node overvoltages rather than undervoltages.

Figure 6:
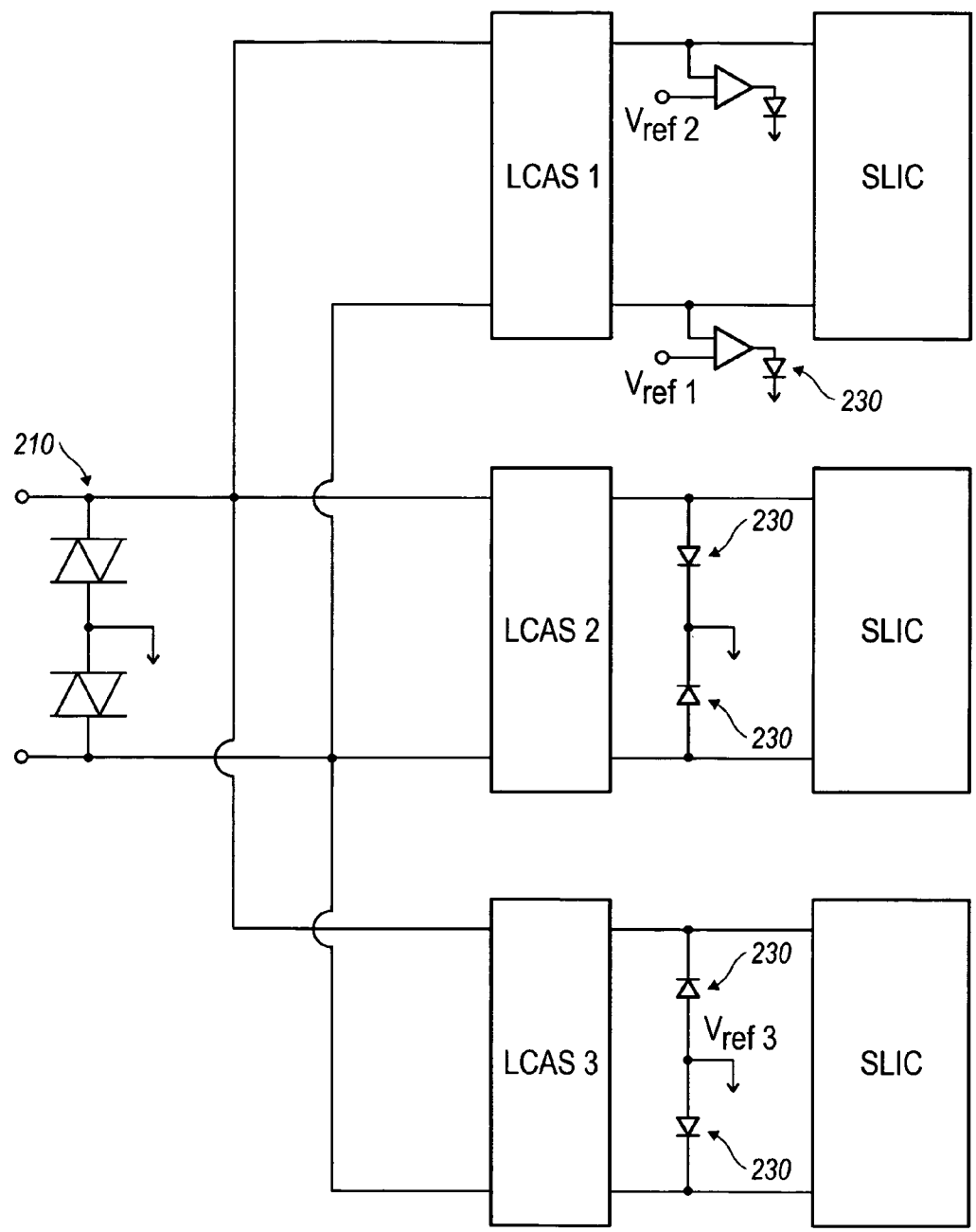
FIG. 6 shows another sample embodiments, in which the line inputs are connected in parallel to multiple line interfaces.

FIG. 6 shows yet another sample embodiment, in which the line inputs are connected in parallel to multiple line interfaces (here labeled LCAS1, LCAS2, and LCAS3.) Many LEDs are used to generate optical fault outputs, which are optically coupled to a shunt pair of protection devices 210. (The optical coupling pathways are not shown in this figure.) Note that several different versions of the circuitry 230 (for voltage detection and optical emission) are shown: e.g. the one attached to LCAS1 uses comparator and amplifier stages to drive the LED.

Figure 7A:
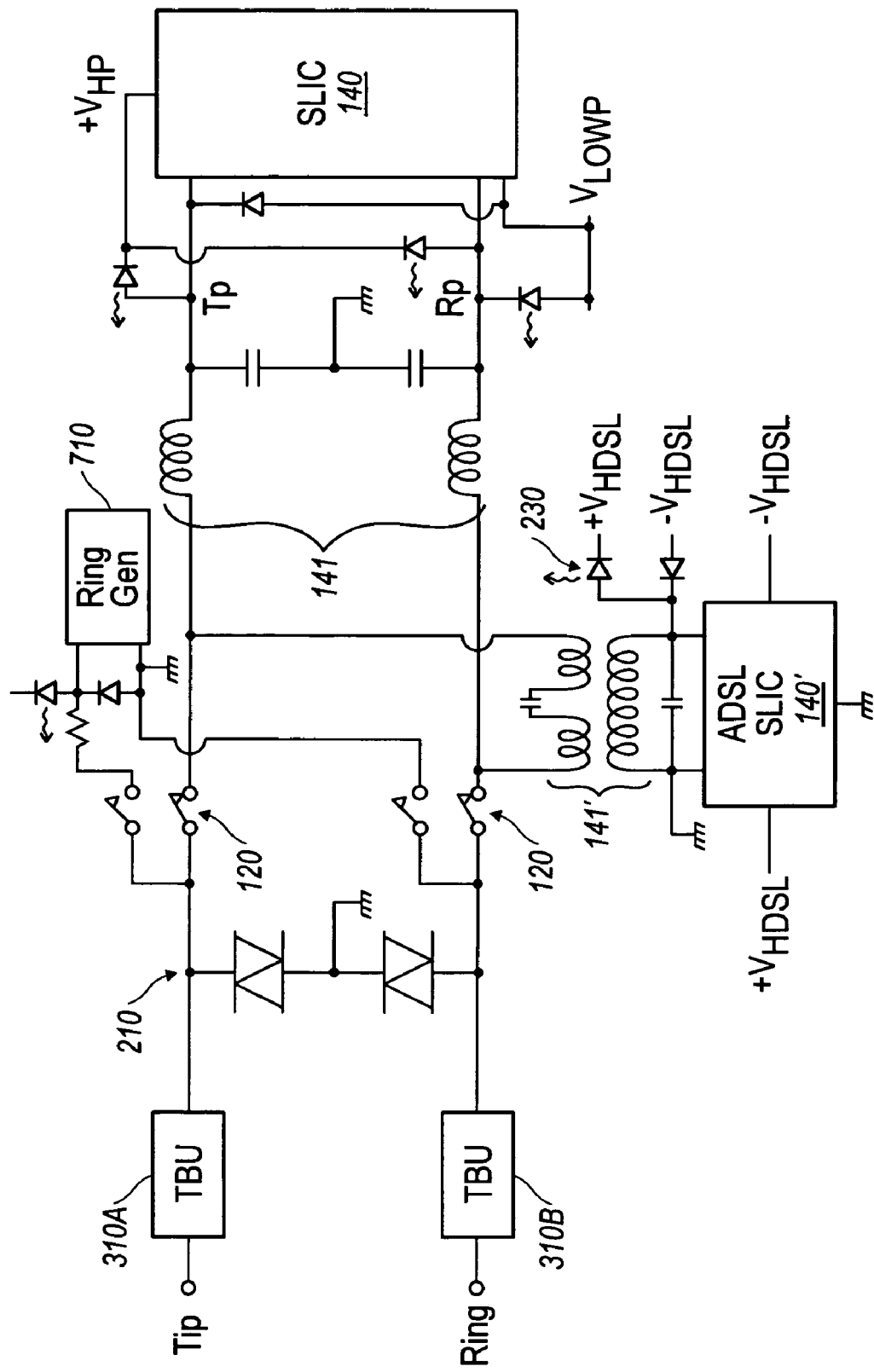
FIG. 7 shows another sample embodiment, consistent with an embodiment of the present innovations.
Figure 7B:
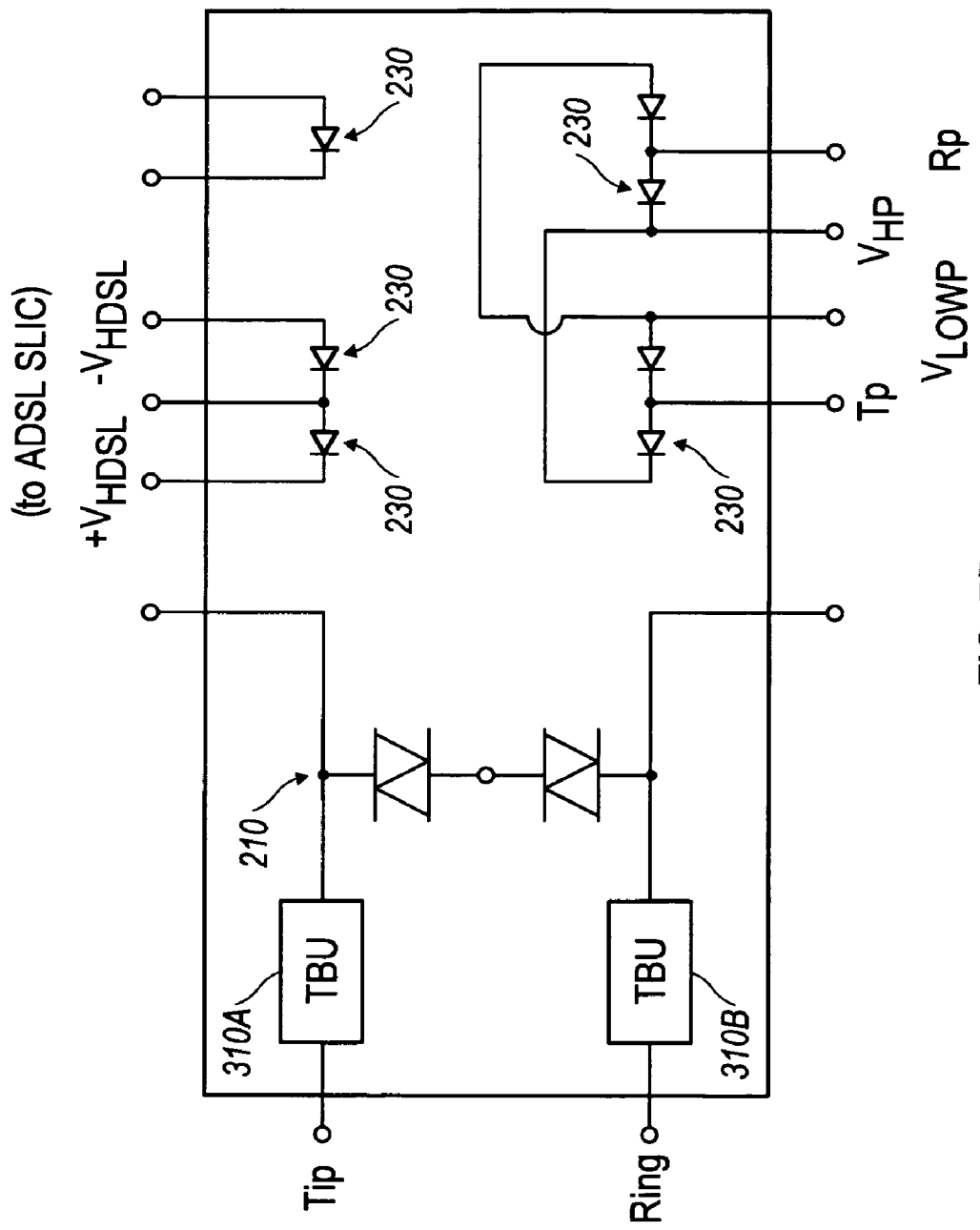

FIGS. 7A and 7B show yet another embodiment, with more details of a sample implementation. In this sample embodiment the shunt protection element 210 is again implemented as a pair of photothyristors, e.g. with 275V rated breakdown. The Tip and Ring terminals are connected, through two TBUs 310 and a relay 120, to a Ring Generator 710, a SLIC 140 (e.g. for standard voice service), and to an ADSL SLIC 140' for DSL connectivity. SLIC 140 is connected through a passive network 141, and ADSL SLIC 140' is connected through an inductive coupling 141'. Note that the voltages seen by the ADSL SLIC 140' are monitored by two voltage detection and optical emission elements 230, to provide overvoltage detection with respect to a supplied reference voltage +V_HDSL and −V_HDSL. Similarly, four voltage detection and optical emission elements 230 are used with the SLIC 140, to ensure that the local versions of Tip and Ring lines do not go above V_HP nor below V_LOWP. (These local versions of Tip and Ring lines at the SLIC 140 are labelled as T_p and R_p respectively, since they are separated by choke and relay from the external connections.)

FIG. 7B gives a sample implementation of the optical elements in the system of FIG. 7A. The outline shown represents a sealed photoisolation package; this can be identical to a standard photoisolation package which includes LEDs and photothyristors, but with the addition of integral TBU elements. (Alternatively, the TBU elements can be connected external to this package if desired.) Many voltage detection and optical emission elements 230 are shown.

The incoming lines Tip and Ring are routed through TBUs 310 and shunt devices 210, and then routed off-chip. A large number of LEDs 230 are integrated into this package, e.g. so that all of them are optically coupled to both of the shunt devices 210. In this example the four LEDs 230 which monitor over- and undervoltages for SLIC 140 are shown at the bottom right, with their connections (as shown in FIG. 7A) to lines P_P, V_LOWP, V_HP, and R_P. Also shown are the two LEDs 230 which clamp the inputs to the ADSL SLIC 140' to approximately the range defined by reference voltages +V_HDSL and −V_HDSL. Also shown is an additional LED 230 (at top right), which can be driven by a logic signal if desired, or connected in other ways, or left unconnected. The connections for protecting the Ring Generator 710 are not explicitly shown, but preferably these too are enclosed within the same module.

According to a disclosed class of innovative embodiments, there is provided: A system, comprising: at least one terminal connection; electronic circuitry connected to said terminal connection; an optically switchable protection device connected to controllably present a low impedance to said connection; and at least one optical emitter which is operatively connected to sense a fault condition at a respective node of said circuitry and to trip said protection device accordingly.

According to a disclosed class of innovative embodiments, there is provided: A system, comprising: at least one terminal connection; electronic circuitry connected to said terminal connection; an optically switchable protection device connected to controllably present a low impedance to said connection; and at least one optical emitter which is operatively connected to sense a fault condition at a respective node of said circuitry and to trip said protection device accordingly.

According to a disclosed class of innovative embodiments, there is provided: A protected electronic system, comprising: at least one terminal connection; a shunt protection device connected to drop overvoltages which may appear at said terminal connection; an automatically-resetting series protection device connected to block overcurrents which may appear at said terminal connection; and one or more triggering devices, each operatively connected to sense an out-of-bounds condition at a respective circuit node which is not directly connected to said terminal connection, and to trigger said shunt protection device accordingly.

According to a disclosed class of innovative embodiments, there is provided: A protected electronic system, comprising: an optically-activated shunt protection device connected to drop overvoltages which may appear across a terminal connection; an automatically-resetting series protection device connected to block overcurrents which may appear at said terminal connection; at least one subscriber line interface circuit, and a relay which selectably connects said interface circuit to said terminal connection; and at least one optical emitter which is electrically connected to be turned on by an out-of-bounds voltage at a node of said interface circuit, and which optically activates said shunt protection device accordingly.

According to a disclosed class of innovative embodiments, there is provided: A protected system, comprising: a first circuit; a second circuit; a protection subcircuit with a first threshold connected to said first circuit capable of stopping overcurrents from reaching the second component, wherein said protection subcircuit is capable of allowing normal operation to resume once the overcurrent is removed, and a remote triggering device with a second threshold, which is connected to said second circuit and is capable of communicating with said protection subcircuit.

According to a disclosed class of innovative embodiments, there is provided: A method of protecting electronics, comprising the actions of detecting an out-of-bounds voltage condition at any respective one of multiple nodes inside an electronic system, and turning on an optical emitter accordingly; optically coupling the output of said optical emitter to activate a protection subcircuit which is not connected to said respective node; and resuming normal operation after said overvoltage is gone.

According to a disclosed class of innovative embodiments, there is provided: A method of protecting electronics, comprising the actions of: detecting an overvoltage at a node inside an electronic system; remotely activating a protection device, in dependence on said detecting step, which is not connected to said node, and resuming normal operation after said overvoltage is gone.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, in one contemplated class of alternative embodiments, optical fault-indication signals can be routed to activate multiple protection devices, e.g. one shunt device with faster response time and one shunt device with a higher peak current rating.

For another example, it is also possible to use a variety of shunt-protection devices other than the thyristor of the preferred embodiment, e.g. SCRs, triacs, or other active devices.

For another example, the triggering stages can be implemented using more complex circuitry than that shown. In various alternative embodiments, amplifier, level-shifter, comparator, and/or driver stages can be used to set the trip point for a particular node, to set a time constant for the out-of-bounds condition, and/or accelerate the turn-on of an LED when a node voltage begins to go out of bounds.

For another example, the fault detection circuitry can be connected to a switchable reference voltage to dynamically adjust the fault detection thresholds for some or all of the overvoltage detection points.

For another example, the fault detection circuitry can also be implemented to directly detect overcurrents rather than overvoltages, e.g. by mirroring a line current to an LED drive current.

The shunt protection devices are shown above as implemented with a grounded center node, but this too is an optional implementation feature.

Optionally the shunt protection devices can be implemented with a variety of active devices or combinations thereof, e.g. a bipolar transistor paralleled with a thyristor.

LEDs can optionally be implemented using laser diodes. It is also possible to use optical emitter devices other than LEDs (e.g. gas-discharge tubes or electroluminescent devices), but LEDs are greatly preferred.

For another example, it is also possible to use fault-indication circuits which trigger on overtemperature as well as overvoltage for additional triggering.

For another example, it is alternatively possible to use electrical rather than optical coupling to connect the triggering devices to the high-voltage protection device, but this is less preferred due to the isolation difficulties.

Further, the present innovations can be implemented in such a way that components within the electronic system can be tested for operational status, current flow, and other predetermined factors, using the optical signaling channel. In addition, this testing can also be used to reveal information about line quality and noise of connections when using an SLIC.

Further, these innovative concepts are not intended to be limited to the specific examples and implementations disclosed herein, but are intended to include all equivalent implementations, such as (but not limited to) using different types of triggering and protection devices (known or unknown at this time) or other devices to replace the example devices used to describe preferred embodiments of the present innovations. This includes, for example, changing the protection in some minor way, such as by adding diodes or other devices or altering the order in which circuits and protection devices are ordered.

Further, LEDs as depicted in the illustrative embodiments can vary in their polarity and triggering conditions, consistent with over and under voltage requirements of the circuits in which they are used.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle. Moreover, the claims filed with this application are intended to be as comprehensive as possible: EVERY novel and non-obvious disclosed invention is intended to be covered, and NO subject matter is being intentionally abandoned, disclaimed, or dedicated.

What is claimed is:

1. A system, comprising:
   at least one terminal connection;
   electronic circuitry connected to said terminal connection;
   at least one optically switchable protection device having a first protection terminal and a second protection terminal, wherein said first protection terminal is disposed between a line feed resistor and a line card access system relay, and said second protection terminal is connected to a ground terminal, whereby said optically switchable protection device is disposed to controllably present a low impedance to said terminal connection; and
   at least one optical emitter which is operatively connected to sense a fault condition at a respective node of said circuitry and to trip said protection device accordingly.

2. The system of claim 1, further comprising a series protection device which blocks overcurrents.

3. The system of claim 1, wherein said terminal is a telephone line connection, and wherein at least one said optical emitter is connected to sense overvoltages at a subscriber line interface circuit which is separated from said protection device by a relay stage.

4. The system of claim 1, further comprising multiple ones of said optical emitters, each optically connected to activate said protection device.

5. The system of claim 1, further comprising at least first and second ones of said optical emitters, each optically connected to activate said protection device; said first and second optical emitters being connected to sense different respective fault conditions.

6. The system of claim 1, wherein said protection device includes a pair of photothyristors.

7. The system of claim 1, further comprising another of said optical emitters, which is optically connected to activate said protection device and electrically connected to be turned on by a logic signal from said circuitry.

8. A protected electronic system, comprising:
   at least one terminal connection;
   a shunt protection device connected to drop overvoltages which may appear at said terminal connection;
   an at least one automatically-resetting series protection device connected to block overcurrents which may appear at said terminal connection, wherein said series protection device is disposed between said terminal connection and said shunt protection device; and
   one or more triggering devices, each operatively connected to sense an out-of-bounds condition at a respective circuit node which is not directly connected to both said terminal connection and said shunt protection device, and to trigger said shunt protection device accordingly.

9. The system of claim 8, wherein said shunt protection device is a thyristor.

10. The system of claim 8, wherein said series protection device is a Transient Blocking Unit.

11. The system of claim 8, comprising multiple ones of said triggering devices, each connected to a respective node which is not said terminal connection.

12. The system of claim 8, further comprising at least first and second ones of said triggering devices, each optically connected to activate said protection device; said first and second triggering devices being connected to sense different respective fault conditions.

13. A protected electronic system, comprising:
an optically-activated shunt protection device connected to drop overvoltages which may appear across a terminal connection;
an automatically-resetting series protection device connected to block overcurrents which may appear at said terminal connection;
at least one subscriber line interface circuit, and a relay which selectably connects said interface circuit to said terminal connection; and
at least one optical emitter which is electrically connected to be turned on by an out-of-bounds voltage at a node of said interface circuit, and which optically activates said shunt protection device accordingly.

14. The system of claim 13, wherein said protection device includes a shunt-connected crowbar device and at least one Transient Blocking Unit.

15. The system of claim 13, wherein said external terminal is a telephone line connection, and wherein at least one said triggering device is connected to sense overvoltages at a subscriber line interface circuit which is separated from said protection device by a relay stage.

16. The system of claim 13, further comprising multiple ones of said triggering devices, each optically connected to activate said protection device.

17. The system of claim 13, further comprising at least first and second ones of said triggering devices, each optically connected to activate said protection device; said first and second triggering devices being connected to sense different respective fault conditions.

18. A protected system, comprising:
a first circuit;
a second circuit;
a protection subcircuit disposed between a communication module tip line and ring line with a first threshold connected to said first circuit capable of stopping overcurrents passing through said tip line or said ring line from reaching said second circuit,
wherein said protection subcircuit is capable of allowing normal operation to resume once said overcurrent is removed, and
a remote triggering device with a second threshold, which is connected to said second circuit and is capable of communicating with said protection subcircuit.

19. The system of claim 18, wherein said protection subcircuit includes a shunt-connected crowbar device and at least one Transient Blocking Unit.

20. The system of claim 18, wherein at least one said triggering device is connected to sense overvoltages at a subscriber line interface circuit which is separated from said protection device by a relay stage.

21. The system of claim 18, further comprising multiple ones of said triggering devices, each optically connected to activate said protection subcircuit.

22. The system of claim 18, further comprising at least first and second ones of said triggering devices, each optically connected to activate said protection subcircuit; said first and second triggering devices being connected to sense different respective fault conditions.

23. The system of claim 18, wherein said protection subcircuit includes a pair of photothyristors.

24. A method of protecting electronics in a communication module, comprising the actions of:
detecting an out-of-bounds voltage condition provided from an external terminal at any respective one of multiple nodes inside said electronic communication module, and turning on an optical emitter accordingly;
optically coupling the output of said optical emitter to activate a protection subcircuit which is not connected to said respective node; and
resuming normal operation after said overvoltage is gone.

25. The method of claim 24, wherein said protection subcircuit includes a shunt-connected crowbar device and at least one Transient Blocking Unit.

26. The method of claim 24, wherein said external terminal is a telephone line connection, and wherein at least one said triggering device is connected to sense overvoltages at a subscriber line interface circuit which is separated from said protection device by a relay stage.

27. The method of claim 24, further comprising multiple ones of said triggering devices, each optically connected to activate said protection subcircuit.

28. The method of claim 24, further comprising at least first and second ones of said triggering devices, each optically connected to activate said protection subcircuit; said first and second triggering devices being connected to sense different respective fault conditions.

29. The method of claim 24, wherein said protection subcircuit includes a pair of photothyristors.

30. A method of protecting electronics in a communication module, comprising the actions of:
detecting an overvoltage provided from an external terminal at a node inside said communication module;
remotely activating a protection device, in dependence on said detecting step, which is not connected to said node, and
resuming normal operation after said overvoltage is gone.

* * * * *